(12) United States Patent
Won et al.

(10) Patent No.: US 10,018,303 B1
(45) Date of Patent: Jul. 10, 2018

(54) METHOD AND SYSTEM FOR TRANSFER OF NATURAL GAS

(71) Applicant: Compass Natural Gas Partners, LP, Camp Hill, PA (US)

(72) Inventors: Hoon Won, Mechanicsburg, PA (US); Dave Fenicle, Manheim, PA (US); Yves E. Pollart, Harrisburg, PA (US)

(73) Assignee: Compass Natural Gas Partners, LP, Camp Hill, PA (US)

( * ) Notice: Subject to any disclaimer, the term of this patent is extended or adjusted under 35 U.S.C. 154(b) by 0 days.

(21) Appl. No.: 15/665,834

(22) Filed: Aug. 1, 2017

Related U.S. Application Data

(63) Continuation-in-part of application No. 15/449,041, filed on Mar. 3, 2017.

(60) Provisional application No. 62/458,199, filed on Feb. 13, 2017.

(51) Int. Cl.
| | | |
|---|---|---|
| *B65B 1/30* | (2006.01) | |
| *F17C 5/06* | (2006.01) | |
| *F17C 13/02* | (2006.01) | |
| *F17D 1/04* | (2006.01) | |
| *F17D 3/10* | (2006.01) | |
| *B60P 3/22* | (2006.01) | |

(52) U.S. Cl.
CPC .............. *F17C 5/06* (2013.01); *B60P 3/225* (2013.01); *F17C 13/025* (2013.01); *F17C 13/026* (2013.01); *F17D 1/04* (2013.01); *F17D 3/10* (2013.01); *F17C 2205/058* (2013.01); *F17C 2221/033* (2013.01); *F17C 2227/00* (2013.01); *F17C 2250/032* (2013.01); *F17C 2250/034* (2013.01); *F17C 2265/061* (2013.01)

(58) Field of Classification Search
CPC ........ F17C 5/06; F17C 13/026; F17C 13/025; F17C 2250/043; F17C 2265/061; F17C 2205/058
See application file for complete search history.

(56) References Cited

U.S. PATENT DOCUMENTS

| | | | |
|---|---|---|---|
| 9,434,598 B2 | 9/2016 | Pick et al. | |
| 2010/0193070 A1* | 8/2010 | Allidieres | F17C 5/06 141/11 |
| 2012/0000574 A1* | 1/2012 | Nishiumi | F17C 5/06 141/94 |

(Continued)

OTHER PUBLICATIONS

Ultimate CNG Receives U.S. Patent for FuelMule Mobile CNG Station, NGV America News, News and Insight for NGV Leaders, Dec. 29, 2016.

*Primary Examiner* — Jason K Niesz
(74) *Attorney, Agent, or Firm* — Buchanan Ingersoll & Rooney PC

(57) ABSTRACT

Systems and methods are disclosed that may be configured for transferring a fluid. The fluid may be transferred from a fluid source by which the fluid is under a first differential pressure to a container via use of a pressurizer that can increase the pressurization of the fluid to a second differential pressure. A controller may be used to coordinate operations of various components to allow the pressure generated by the pressurizer to be used to augment the pressure generated by the first differential pressure. Additional embodiments may include use of a mobile fueling unit that may facilitate transfer of the fluid from the container to a vehicle.

25 Claims, 5 Drawing Sheets

(56) References Cited

U.S. PATENT DOCUMENTS

2016/0116115 A1* 4/2016 Leavitt ............... F17C 1/08
340/10.1

* cited by examiner

METHOD AND SYSTEM FOR TRANSFER OF NATURAL GAS

CROSS-REFERENCE TO RELATED APPLICATIONS

This patent application is a continuation-in-part of, and claims the benefit of, co-pending U.S. patent application Ser. No. 15/449,041, filed on Mar. 3, 2017, which claims the benefit of U.S. Provisional Application Ser. No. 62/458,199 titled "Method and System for Transfer of Natural Gas" filed on Feb. 13, 2017, the entire contents of each is which are incorporated herein by reference.

FIELD OF THE INVENTION

Embodiments of the invention are related to methods and systems for transferring a fluid, which may include transfer of natural gas, from a first location to a second location under a first differential pressure and from the second location to a container under a second differential pressure.

BACKGROUND OF THE INVENTION

Natural gas (e.g., methane) can be used for fuel and/or as a constituent in some chemical processes. Natural gas may be generated in several ways. These may include but are not limited to extraction from a terrestrial well, being a product of or a by-product from a chemical process, distillation of a hydrocarbon product, etc. Some methods of acquiring natural gas may produce the natural gas under a differential pressure to cause it to flow in a desired direction. For example, natural gas extracted from a terrestrial well may be placed under a differential pressure to cause it to be extracted from the well and/or to cause it to flow through a pipeline of a distribution network. The distribution network can include a well, a gathering line extending from the well, an intrastate or interstate transmission main extending from the gathering line, a city gate (e.g., gate station), and/or a local distribution system. The distribution system may be operated by a local distribution company ("LDC").

With existing systems, users of natural gas typically tap into the local distribution system of the LDC to obtain a supply of the natural gas. However, conventional systems and methods of doing so may not utilize the first differential pressure to cause the natural gas to flow and/or to provide a pressure in the system intended to receive the natural gas. Furthermore, with conventional systems, users of natural gas may not have ready access to the interstate/intrastate transmission main portion of the distribution network and can be forced to rely on the LDC.

The present invention is directed towards overcoming the above-identified problems.

SUMMARY OF THE INVENTION

Embodiments of the method and system can include a means to transfer a fluid from a first location to a second location via a first differential pressure generated by the first location. Embodiments of the method and system may further include a means to transfer the fluid from the second location to a container via the first differential pressure. The first differential pressure may be used to transfer the fluid into the container until the fluid within the container reaches a first pressure and/or a first temperature. Embodiments of the method and system may be used to increase the pressure of the fluid via a pressurizer so that a second differential pressure can be generated between the second location and the container. The pressurizer can be a compressor, a pump, or other machine that can increase the pressure of the fluid. The second differential pressure can be used to cause more fluid to be transferred into the container until the fluid within the container reaches a second pressure and/or a second temperature.

Various components of the system can be controlled and coordinated by a controller. The controller may be a programmable logic controller ("PLC"). This may be done so that the system may automatically cause the fluid to flow from the second location to the container under the first differential pressure until the first pressure and/or first temperature is reached and then cause the fluid to flow from the second location to the container under the second differential pressure until the second pressure and/or the second temperature is reached.

In some embodiments, the means at the first location is part of the inventive method and system. In some embodiments, the means at the first location is an ancillary system by which the inventive method and system is connected. Embodiments of the method and system may be configured to utilize the first differential pressure supplied by the first location. This may include allowing the fluid to "free flow" (i.e., allow the fluid to flow without having to force the fluid to flow with additional pressure) from the first location to the container. Embodiments of the method and system can be further configured so that the pressurizer may only have to increase the pressure by an amount that is a difference between the second differential pressure and the first differential pressure to cause the fluid within the container to reach the second pressure and/or second temperature.

Some embodiments can include use of a mobile fuel unit that may facilitate transfer of the fluid from the container to a vehicle (e.g., a truck, a bus, etc.). The mobile fuel unit may be configured to provide fleet fueling operations. For example, the mobile fuel unit may be connected to the container. The container with the mobile fuel can be referred to as a mobile fueling unit and can be transported to a delivery site or a customer site. Fuel within the container can be transferred to vehicles configured to use the fluid as fuel via the mobile fuel unit.

In some embodiments, the first location may be a portion of the distribution network. In at least one embodiment, the first location may be the interstate/intrastate transmission main. For example, the first location may be an interstate/intrastate transmission main configured to transport natural gas as the fluid. One advantage of an embodiment of the method and system can include the ability to tap into the interstate/intrastate transmission main to purchase natural gas at a cost effective price and/or utilize the first differential pressure (e.g., 200 to 1,500 pounds per square inch gauge ("PSIG")) supplied by the transmission main operator. This may include using the 200 to 1,500 PSIG to allow the natural gas to "free flow" from the first location to the container until the natural gas reaches the first pressure and/or the first temperature.

Conventional methods and systems, however, may be configured to connect to local distribution system of an LDC and not use the first differential pressure from the transmission main, or at least use a substantial portion of the first differential pressure. Instead, conventional methods have inlet pressures up to 200 PSIG. One reason for this may be due to the LDC requiring smaller volumes of natural gas to be transferred. This may require small-diameter pipes used to facilitate the transfer. The differential pressure required to move natural gas through the LDC's distribution network may be much lower than that found in the transmission main pipelines. While natural gas traveling through transmission main pipelines may be compressed to as much as 1,500 pounds per square inch (psi) to move large volumes hundreds and thousands of miles, natural gas traveling through the distribution network of the LDC can require as little as up to 200 psi of pressurization and can be as low as ¼ psi at the customer's meter. At the city gate, pressure regulators can be operated to reduce the pressure from 1,500 psi to the lower pressure. In addition to smaller volumes of gas, some LDC systems are older systems that may not be able to withstand the higher pressures. Additionally, there can be a safety concern in having high pressure mains through residential/industrial areas.

Embodiments of the method and system can facilitate delivery of the compressed natural gas to a variety of customers including industrial, institutional, residential, and/or fleet customers. The delivery may be beneficial for customers who wish to utilize an alternative form of energy (e.g., natural gas) in lieu of fuel oil, propane, etc. but for which may not have easy, timely, and/or economically feasible access to natural gas. In addition, embodiments of the mobile fuel unit may serve as bridge until a permanent natural gas source is available.

Some embodiments can include a fluid transfer system. The fluid transfer system can include a receiving location including a first processing means to receive a fluid from a sourcing location via a first differential pressure provided by the sourcing location. The fluid transfer system can further include a container configured to receive the fluid from the receiving location via the first differential pressure until the fluid within the container reaches a first pressure and/or a first temperature. The first processing means may include a pressurizer to increase a pressure of the fluid so that a second differential pressure can be generated between the receiving location and the container. The second differential pressure may cause the fluid to transfer into the container until the fluid within the container reaches a second pressure and/or a second temperature.

In some embodiments, the fluid transfer system can further include the sourcing location, the sourcing location including a second processing means to generate the first differential pressure. In some embodiments, the second processing means can include at least one source of the fluid and/or at least one fluid stream. In some embodiments, the at least one source can include a natural gas well and the at least one fluid stream comprises an interstate/intrastate main pipeline. In some embodiments, the pressurizer can increase the pressure by an amount that is a difference between the second differential pressure and the first differential pressure. In some embodiments, the first processing means can include a meter and regulation unit. The meter and regulation unit may be configured to receive the fluid from the sourcing location. In some embodiments, the first processing means can include a terminal unit. The terminal unit can include the pressurizer and may be configured to selectively transfer the fluid to a fill post. In some embodiments, the first processing means can include a pipeline configured to facilitate transfer of the fluid from the meter and regulation unit to the terminal unit.

In some embodiments, the system can further include at least one controller in electro-mechanical connection with the pressurizer. The controller may be programmed to measure a pressure and/or a temperature of the fluid within the container. The at least one controller may be further programmed to cause the pressurizer to increase the pressure of the fluid from the first differential pressure to the second differential pressure after the fluid within the container has reached the first pressure and/or the first temperature. The at least one controller may be further programmed to cause the pressurizer to cause more of the fluid to flow into the container until the fluid within the container reaches the second pressure and/or the second temperature. The at least one controller may be further programmed to cause the system to prevent the flow of fluid from the receiving location after the fluid in the container has reached the second pressure and/or the second temperature.

In some embodiments, the pressurizer may be a compressor. In some embodiments, the compressor may be configured to be at least one of electrically driven by an electrical motor and natural gas driven by a natural gas engine.

In some embodiments, the receiving location can include an electrical generator configured to operate on the fluid. In some embodiments, at least some of the fluid received by the receiving location can be diverted to the electrical generator to generate augmented electrical power. In some embodiments, the augmented electrical power can be transferred to the compressor.

In some embodiments, the system can further include a controller in electro-mechanical connection with both the compressor and the generator. The controller may be programmed to cause the generator to operate when the controller senses the compressor compressing the fluid. The controller may be further programmed to cause the generator to cease operation when the controller senses the compressor not compressing the natural gas.

In some embodiments the fill post can include at least one dispenser to transfer the fluid from the fill post to a vehicle. The fill post may further include at least one transfer hose to transfer the fluid from the fill post to the container.

In some embodiments, the system can be configured to transfer the fluid from the receiving location to a plurality of containers.

In some embodiments, the system can include a computer system by which the at least one controller is in electrical communication with. In some embodiments, the container can be configured to be transported by a vehicle. At least one of the container and the vehicle can be provided with a RFID tag. The system may further include an RFID tag reader. The RFID tag reader may be in electrical communication with the computer system.

Some embodiments can include a mobile fueling unit. The mobile fueling unit may include a container configured to receive and dispense a fuel gas. The container may further be configured to be transported by a vehicle. The mobile fueling unit may include a compressor affixed to the container. The compressor may be configured to be driven by an engine operable by the fuel gas. The compressor may be in fluid transfer with the container to facilitate flow of the fuel gas from the container to a vehicle.

A method of fluid transfer may include receiving, at a receiving location, a fluid from a sourcing location. The sourcing location may provide a first differential pressure to cause the fluid to flow. The method may further include receiving, at a container, the fluid from the receiving location by means of the first differential pressure until the fluid within the container reaches a first pressure and/or a first temperature. The method may further include increasing the pressure of the fluid via a pressurizer so that a second differential pressure can be generated between the receiving location and the container. The second differential pressure may cause the fluid to transfer into the container until the fluid within the container reaches a second pressure and/or a second temperature.

A method of fluid transfer may include receiving, at a filing station, natural gas from an interstate/intrastate transmission main via a processing means of the filing station. The processing means may include a meter and regulation unit configured to receive the natural gas from the interstate/intrastate transmission main. The processing means may include a terminal unit including a first compressor configured to selectively transfer the natural gas to a fill post. The processing means may include a pipeline configured to facilitate transfer of the natural gas from the meter and regulation unit to the terminal unit. The method may further include controlling, via a programmable logic controller, the natural gas flow by allowing a first differential pressure of the interstate/intrastate transmission main. This may include causing the natural gas to transfer from the interstate/intrastate transmission main to the meter and regulation unit.

The method may further include selectively controlling, via the programmable logic controller, the natural gas flow. This may include first allowing the first differential pressure to cause the flow of the natural gas from the meter and regulation unit, through the pipeline, through the terminal unit, through the fill post, and into a container until the natural gas within the container reaches a first pressure and/or a first temperature, and then causing the first compressor to increase the pressure of the natural gas so that a second differential pressure can be generated between the first compressor and the container to cause more natural gas to flow from the terminal unit, through the fill post, and into the container until the natural gas within the container reaches a second pressure and/or a second temperature. The second differential pressure may be greater than the first differential pressure. The second pressure and/or the second temperature may be greater than the first pressure and/or first temperature.

The method may further include measuring, via programmable logic controller, the pressure and/or temperature of the natural gas within the container. The method may further include diverting, programmable logic controller, at least some of the natural gas to a natural gas generator. This may be done to selectively generate augmented electrical power. The augmented electrical power may be selectively transferred to the first compressor. The generator may selectively generate the augmented electrical power and selectively transfer the augmented electrical power to the first compressor only when the first compressor is increasing the pressure of the natural gas.

The method may further include selectively transferring the natural gas from the fill post and into a vehicle. The method may further include transporting the container via the vehicle from the filling station to a delivery site or a customer site. The method may further include transferring the natural gas from the container to a user. The transferring may include depressurizing the natural gas to a third pressure. The third pressure may be less than the second pressure.

The method may further include tracking at least one of the container and the vehicle via a computer system. The tracking can include reading at least one RFID tag attached to the container and/or the vehicle via at least one RFID reader. The RFID reader may be in electrical communication with the computer system.

The method may further include configuring at least one container to have a second compressor. The second compressor may be in fluid communication therewith. The method can include driving the second compressor by an engine operable by the natural gas within the container to cause transfer of the natural gas from the container to a fleet vehicle.

A method of fluid transfer may include tapping into an interstate/intrastate transmission main. The method may further include receiving, at a filing station, natural gas from the interstate/intrastate transmission main via a processing means of the filing station. The processing means can include a meter and regulation unit. The meter and regulation unit may be configured to receive the natural gas from the interstate/intrastate transmission main. The processing means may further include a terminal unit. The terminal unit can include a first compressor configured to selectively transfer the natural gas to a fill post. The processing means may further include a pipeline configured to facilitate transfer of the natural gas from the meter and regulation unit to the terminal unit.

The method may further include controlling, via a programmable logic controller, the natural gas flow. This can include allowing a first differential pressure of the interstate/intrastate transmission main to cause the natural gas to transfer from the interstate/intrastate transmission main to the meter and regulation unit. The method may further include selectively controlling, via the programmable logic controller, the natural gas flow. This may include allowing the first differential pressure to first cause the flow of the natural gas from the meter and regulation unit, through the pipeline, through the terminal unit, through the fill post, and into a container until the natural gas within the container reaches a first pressure and/or a first temperature, and then causing the first compressor to increase the pressure of the natural gas so that a second differential pressure is generated between the first compressor and the container. The second differential pressure may be used to cause more natural gas to flow from the terminal unit, through the fill post, and into the container until the natural gas within the container reaches a second pressure and/or a second temperature. The second differential pressure can be greater than the first differential pressure. The second pressure and/or the second temperature can be greater than the first pressure and/or first temperature.

The method can further include measuring, via the programmable logic controller, the pressure and/or temperature of the natural gas within the container. The method can further include diverting, via the programmable logic controller, at least some of the natural gas to a natural gas generator to selectively generate augmented electrical power. The augmented electrical power may be selectively transferred to the first compressor. The generator may selectively generate the augmented electrical power and selectively transfer the augmented electrical power to the first compressor only when the first compressor is increasing the pressure of the natural gas. The method may further include selectively transferring the natural gas from the fill post and into a vehicle. The method may further include transporting the container via the vehicle from the filling station to a delivery site or a customer site. The method may further include transferring the natural gas from the container to a user.

A method of fluid transfer may include tapping into an interstate/intrastate transmission main configured to transmit natural gas. The method can further include controlling the flow of the natural gas flow by allowing a first differential pressure of the interstate/intrastate transmission main to cause the natural gas to transfer from the interstate/intrastate transmission main into a container. The method can further include generating a second differential pressure to cause more natural gas to flow into the container. The method can further include transporting the container to a delivery site or a customer site. The method can further include transferring the natural gas from the container to a user.

While some embodiments may describe use of the method and system with natural gas as the fluid, any fluid is capable of being transported under a differential pressure may be used. This may include a gas, a liquid, a slush, a slurry, a particle-based fluid, etc. Furthermore, the gas is not limited to natural gas. Other gases such as biogas, carbon monoxide, hydrogen, coke gas, etc. may be used.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

Figure 1:
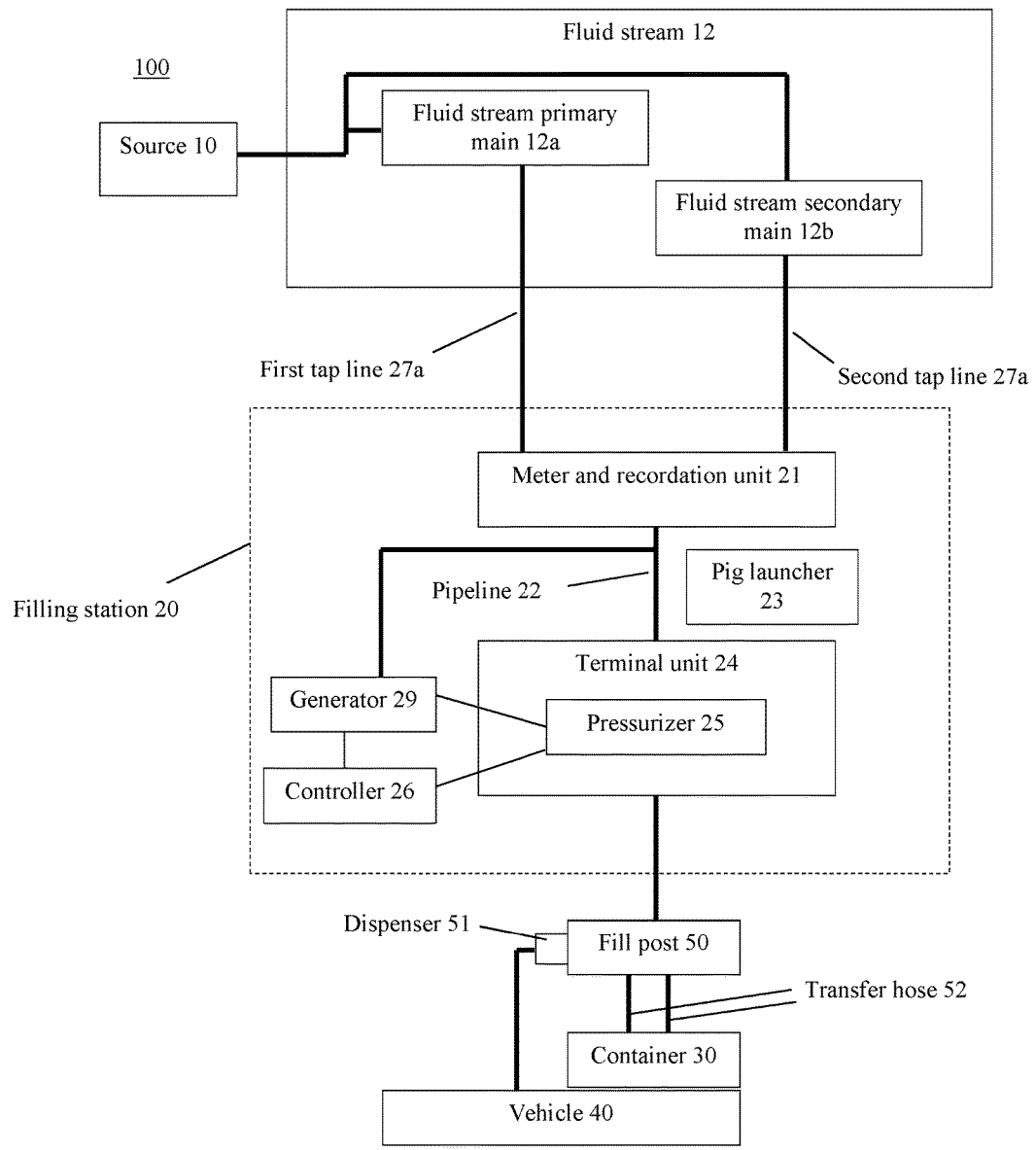
FIG. 1 is an exemplary process flow diagram of an embodiment of the system 100.

The following description is of exemplary embodiments that are presently contemplated for carrying out the present invention. This description is not to be taken in a limiting sense, but is made merely for describing the general principles and features of the present invention. The scope of the present invention is not limited by this description.

Embodiments of the method can include a system 100 that may be configured for transferring a fluid. The fluid can be a pressurized fluid. In some embodiments, the fluid can be pressurized by the system 100. In some embodiments, the fluid can be pressurized by an ancillary system to which the system 100 is in connection with. The fluid can be a gas. For example, the fluid can be natural gas (e.g., methane), biogas, hydrogen, by-product gas (e.g., coke gas), etc.

An embodiment of the system 100 can be configured to transfer the fluid from a source 10 and/or a fluid stream 12 to a filling station 20. The transfer from the source 10 and/or the fluid stream 12 to the filling station 20 can include utilizing a first differential pressure of the fluid to cause the fluid to flow from the source 10 and/or the fluid stream 12 to the filling station 20. The first differential pressure may be provided by the source 10 and/or the fluid stream 12. In some embodiments, the system 100 can be configured such that the first differential pressure exists between the filling station 20 and the source 10 and/or fluid stream 12. Embodiments of the system 100 can be further configured to transfer the fluid from the filling station 20 to a container 30. The container 30 can be a mobile container 30. This may include a container 30 configured as a trailer of a vehicle 40, where the vehicle 40 may be configured to transport the container 30, for example. The transfer of the fluid from the filling station 20 to the container 30 can include utilizing the first differential pressure of the fluid to cause the fluid to flow from the filling station 20 to the container 30. In some embodiments, the system 100 can be configured to selectively allow the first differential pressure to exist between the container 30 and the source 10 and/or fluid stream 12.

Embodiments of the system 100 may include a pressurizer 25. This can include a compressor, a pump, etc. The pressurizer 25 can be configured to change the pressure of the fluid. In some embodiments, the filling station 20 can include the pressurizer 25. The pressurizer 25 can be configured to increase the pressure of the fluid from the first differential pressure to a second differential pressure. In some embodiments, the system 100 can be configured to selectively allow the second differential pressure to exist between the pressurizer 25 and the container 30. In some embodiments, the system 100 can be configured to utilize the first differential pressure to cause the fluid to flow from the filling station 20 to the container 30 until the fluid within the container 30 reaches a first pressure and/or a first temperature, and then utilize the pressurizer 25 to cause more of the fluid to flow from the filling station 20 to the container 30 until the fluid within the container 30 reaches a second pressure and/or a second temperature.

As disclosed herein, the system 100 may include several components to facilitate transfer of the fluid. Any one component can be connected to any one other component to facilitate a fluid transfer there-between. This may be achieved through piping, conduit, couplings, etc. Control of flow (e.g., direction, flow rate, flux, etc.) can be achieved via use of valves, eductors, pumps, compressors, Venturi tubes, meters, switches, etc.). Embodiments of the system 100 may be configured to contain the fluid within the system 100 under pressure. Establishing fluid transfer between component parts, controlling flow of fluids, and containing a fluid under pressure is well known and a detailed description of how to configure the system 100 to achieve the same is not necessary.

It is contemplated for some embodiments to include more than one source 10, fluid stream 12, filling station 20, fluid, container 30, pressurizer 25, and/or any other component disclosed herein to meet design criteria. For example, an embodiment of the system 100 can include any number of sources 10, fluids, containers 30, pressurizers 25, etc. Any suitable number of system 100 components can be used to meet a particular objective. The particular configuration and type of such components can also be adjusted to meet a particular set of design criteria, such as system 100 efficiency for providing a desired output that meets a preselected set of criteria, for example. Therefore, while certain exemplary embodiments of system 100 and methods of making and using the same are discussed and illustrated herein, it is to be distinctly understood that the invention is not limited thereto but may be otherwise variously embodied and practiced within the scope of the following claims.

A source 10 can be a supply of the fluid. This can include a well, a production facility, a chemical process, a wastewater treatment plant, etc. For example, with embodiments where the fluid is natural gas, the source 10 can be a gas well, a landfill, an agricultural operation, a municipal and/or an industrial wastewater treatment plant, a treatment plant that produces biogas, a gas distribution system, an interstate/intrastate gas main, etc. A source 10 may generate a plurality of fluids 10. The source 10 may provide a plurality of fluids 10, where each fluid can be the same type of fluid as each other fluid, a different type of fluid from each other fluid, or any combination thereof. Some sources 10 can be configured to provide a fluid stream 12 by which the fluid is transferred. Some sources 10 can be configured to provide a plurality of fluid streams 12. Some sources 10 can be configured to provide a first fluid through a first fluid stream, a second fluid through a second fluid stream, a third fluid through a third fluid stream, etc. The first fluid can be the same as or different from any of the second fluid, third fluid, etc. The second fluid can be the same as or different from any of the first fluid, third fluid, etc. Some sources 10 can provide a fluid at the first differential pressure. The first differential pressure can be generated by a process by which the source 10 generates the fluid. For example, if the source 10 is a natural gas well, volumetric pressure (e.g., formation pressure etc.) used to extract the natural gas from the ground may be part of the first differential pressure. Other forms of pressure generation may be used. The first differential pressure may also exist in the fluid stream 12. In embodiments with a source 10 configured to provide more than one fluid stream 12, the first differential pressure in the first fluid stream can be the same as or different from the first differential pressure in the second fluid stream, third fluid stream, etc. The first differential pressure in the second fluid stream can be the same as or different from the first differential pressure in the first fluid stream, third fluid stream, etc.

The fluid stream 12 can be a pipeline for example. In some embodiments, the fluid stream 12 can be an interstate/intrastate transmission pipeline. As disclosed herein, the interstate/intrastate transmission pipeline may be referred to as the instate/intrastate transmission main or interstate/intrastate main pipeline. For instance, the system 100 may include a natural gas well as the source 10 in connection with an interstate/intrastate main pipeline as the fluid stream 12.

In some embodiments, the source 10 and/or the fluid stream 12 can be part of the system 100. For example, embodiments of the system 100 can be configured to be part of the natural gas distribution network. In some embodiments, the source 10 and/or the fluid stream 12 can be an ancillary system to which the system 100 may be connected. For example, embodiments of the system 100 may be selectively connected to the natural gas distribution network. This may be achieved via tapping into an interstate/intrastate transmission main pipeline 12 of the natural gas distribution network via a tap line 27, for example.

Embodiments of the filling station 20 can be configured to tap into the source 10 and/or the fluid stream 12. Tapping into the source 10 and/or fluid stream 12 can facilitate transfer of the fluid from the source 10 and/or fluid stream 12 to the filling station 20. The transfer can include utilizing the first differential pressure provided by the source 10 and/or fluid stream 12 to cause the fluid to flow from the source 10 and/or fluid stream 12 to the filling station 20.

The filling station 20 can include a meter and regulation unit 21. In some embodiments, the meter and regulation unit 21 can be remote from the filing station 20. Embodiments of the meter and regulation unit 21 can include means to facilitate tapping into, and maintaining fluid transfer with, the source 10 and/or fluid stream 12. This may include a tap line 27, for example. The filling station 20 may further include a pipeline 22. The pipeline 22 may be in fluid transfer with the meter and regulation unit 21. The pipeline 22 may be piping or a piping network, for example. The filling station 20 may further include a terminal unit 24. The terminal unit 24 may include the pressurizer 25. The pipeline 22 may be configured to be in fluid transfer with the pressurizer 25 to facilitate transfer of the fluid from the meter and regulation unit 21 to the terminal unit 24.

The terminal unit 24 may be in fluid transfer with a fill post 50 to facilitate transfer of the fluid from the terminal unit 24 to the fill post 50. The fill post 50 can be configured to allow the container 30 to be selectively coupled thereto. The coupling may facilitate fluid transfer between the fill post 50 and the container 30. The coupling may be via a transfer hose 52, for example. When the container 30 is coupled to the fill post 50, transfer of the fluid from the fill post 50 to the container 30 may occur.

In some embodiments, the transfer of fluid from the source 10 and/or fluid stream 12 to the container 30 can be by the first differential pressure causing the fluid to flow from the source 10 and/or fluid stream 12 to the container 30. This may be particularly beneficial because the source 10 and/or fluid stream 12 can provide the first differential pressure, and thus the fluid flowing from the source 10 and/or fluid stream 12 can be achieved by merely allowing the fluid to flow. For instance, the system 100 may be tapped into the source 10 and/or fluid stream 12 such that a valve selectively allows the fluid to flow from the source and/or fluid stream 12, the flow being caused by the first differential pressure generated by the source 10 and/or fluid stream 12. This may be referred to as allowing the fluid to "free flow" from the source 10 and/or fluid stream 12. Free flow may be used to allow the fluid to flow from the source 10 and/or fluid stream 12 to any component of the system 100. Free flow may be used to allow the fluid to flow from any component of the system to another component of the system 100. For example, in embodiments where the source 10 and/or the fluid stream 12 is/are part of an ancillary system to which the system 100 is connected, the ancillary system can provide the first differential pressure. This can reduce cost and complexity in the system 100. For instance, the system 100 may be configured to augment the first differential pressure to generate the second differential pressure. The second differential pressure may be used to pressurize the fluid within the container 30 to a desired pressure (e.g., the second pressure). By augmenting the first differential pressure to generate the second differential pressure, the pressurizer 25 may be configured to only generate a difference between the second differential pressure and the first differential pressure to reach the second differential pressure.

The system 100 may include a controller 26. The controller 26 can be a processor in electrical connection with a non-transitory, non-volatile memory. Software can be stored within the memory of the controller 26. The controller 26 may be configured to execute algorithms encoded in program logic. For example, the controller 26 may be a programmable logic controller ("PLC"). The controller 26 can be programmed to measure the volume, flow-rate, flux, pressure, etc. of the fluid. The controller 26 can be further programmed to control operations of any of the components. For example, the controller 26 may be in electro-mechanical connection with any of the components (e.g., the pressurizer 25, a valve, meter, pump, etc.). One way to achieve this is for a component to include a processor in operative connection with the mechanical and/or electrical elements of the component. Application program interface ("API") software, for example, may be used to coordinate operations of the various components via the controller. The controller 26 may be used in connection with any component of the system 100 via a hardwire and/or via wireless communication. Wireless communication can be achieved via use of transceivers, for example. For instance, any of the controllers 30 and/or system components can include a transceiver configured to transmit and/or receive data. Software can be used by the processor of the controller 26 to execute program logic that transmits command signals to a component of the system 100.

In one embodiment, the controller 26 can cause the system 100 to allow the fluid to free flow into the container 30 until the fluid in the container 30 reaches the first pressure and/or the first temperature. This may include allowing the fluid to free flow from the source 10 and/or fluid stream 12 to the filling station 20. This may further include allowing the fluid to free flow from the terminal unit 24 to the container 30. The controller 26 can then cause the pressurizer 25 to increase the pressure of the fluid from the first differential pressure to the second differential pressure. Generating the second differential pressure can cause more of the fluid to flow into the container 30 until the fluid within the container 30 reaches the second pressure and/or the second temperature. The second differential pressure may be generated between the terminal unit 24 and the container 30. The first differential pressure may be less than the second differential pressure. The first pressure may be less than the second pressure. The first temperature may be less than the second temperature.

In one embodiment, the controller 26 can be programmed to measure the pressure and/or temperature of the fluid within the container 30. The controller 26 may be programmed to allow the system 100 to cause the fluid to free flow until the fluid in the container 30 reaches the first pressure and/or the first temperature. The controller 26 may be further programmed to cause the pressurizer 25 to increase the pressure of the fluid from the first differential pressure to the second differential pressure after the fluid within the container 30 has reached the first pressure and/or the first temperature. The controller 26 may be further programmed to cause the pressurizer 25 to cause more of the fluid to flow into the container 30 until the fluid within the container 30 reaches the second pressure and/or the second temperature. The controller 26 may be further programmed to cause the system 100 to prevent the flow of fluid from the terminal unit 24 after the fluid in the container 30 has reached the second pressure and/or the second temperature.

FIG. 1 shows an exemplary process flow diagram of an embodiment of the system 100. The system 100 can include the filling station 20. The filling station 20 can be configured to be placed into fluid transfer with the fluid stream 12. The fluid stream 12 may be an interstate/intrastate main pipeline 12. For example, the filling station 20 can include at least one tap line 27 that may establish fluid transfer with the interstate/intrastate main pipeline 12. The tap line 27 may be upwards of a sixteen-inch diameter pipeline. For example, the tap line 27 may range from a four-inch diameter pipeline to a sixteen-inch diameter pipeline. The diameter may depend on the amount and/or flow rate of the natural gas to be expected from the natural gas well 10 and/or interstate/intrastate main pipeline 12, as well as the pressure. The diameter may further depend on the amount and/or flow rate of the natural gas to be expected for transfer to the filling station 20. The fluid stream 12 may be at least one interstate/intrastate main pipeline 12 extending from a natural gas well as the source 10, where the fluid may be natural gas. In some embodiments, the interstate/intrastate main pipeline 12 may include a primary main pipeline 12a (e.g., fluid stream primary main) and a secondary main pipeline 12b (e.g., fluid stream secondary main). The tap line 27 can include a first tap line 27a connected to the primary main pipeline 12a and a second tap line 27b connected to the secondary main pipeline 12b. The first tap line 27a may be separate from the second tap line 27b. This configuration may be done to allow for seamless delivery of natural gas. For example, if the primary main pipeline 12a becomes inoperable for any reason, natural gas can be drawn from the secondary main pipeline 12b. For example, the controller 26 can be in electro-mechanical connection with a valve that is configured to selectively allow natural gas to flow from the primary main pipeline 12a, the secondary main pipeline 12b, or both. The valve can be controlled to selectively adjust the flow of natural gas from the primary main pipeline 12a, the secondary main pipeline 12b, or both. This can include allowing free flow from any one or both pipeline 12a, 12b, allowing restricted flow from any one or both pipeline 12a, 12b, and/or preventing flow from any one or both pipeline 12a, 12b. The controller 26 may be programmed to allow natural gas to flow from the primary main pipeline 12a when natural gas flow from the fluid stream 12 is desired. The controller 26 may be programmed to sense if the flow from the primary main pipeline 12a is restricted and/or interrupted. If the flow from the primary main pipeline 12a is restricted and/or interrupted, the controller 26 can cause the valve to allow flow from the secondary main pipeline 12b. This can include preventing or reducing flow from the primary main pipeline 12a.

The filling station 20 can include the meter and regulation unit 21. The meter and regulation unit 21 may be a facility configured to house metering, recordation, pressure regulation, and/or fluid conditioning components. This may include a building or other structure. Other components of the meter and regulation unit 21 may include meters, oil/water separators, valves, transmitters, etc. The meter and regulation unit 21 may be further configured to receive natural gas from the tap line 27. In at least one embodiment, the meter and regulation unit 21 can be a fenced in facility configured to house at least one oil/water separator, a first pre-fabricated building configured to house at least one meter with associated valves and transmitters, and a second pre-fabricated building configured to house recording instrumentation. In some embodiments, the first pre-fabricated building may include more than one meter. One of the meters may be used to be on standby at least part of the time. In some embodiments, one of the meters may be used to be on standby unless another meter is inoperable, at which time the standby meter can begin metering.

In some embodiments, the meter and regulation unit 21 may include a pig launcher 23 and associated equipment. This may be used to facilitate pigging operations, such as launching of pigs into any of the pipelines. For example, the filling station 20 may further include a pipeline 22 that can be configured to facilitate transfer of the natural gas from the meter and regulation unit 21. The pipeline 22 may further facilitate transfer of the natural gas to the terminal unit 24. The pig launcher 23 may be used to clean the pipeline 22 of debris. For example, the pig launcher 23 may be configured to introduce a pig into a pipeline (e.g., the pipeline 22) to be caused to travel through the pipeline and clear if of debris. This can be done periodically or in accordance with any other schedule.

The pipeline 22 may be configured as a gas pipeline that extends from the meter and regulation unit 21 to the terminal unit 24. The pipeline 22 can be a six-inch diameter gas pipeline, for example. Other sized pipelines can be used, such as a four-inch diameter, eight-inch diameter, ten-inch diameter, etc. In some embodiments, the pipeline 22 may be configured to extend approximately 2,500 feet in length. Other lengths can be used, such as 1,500 feet, 2,000 feet, 3,000 feet, etc. Any size and/or length that may facilitate transfer of the natural gas from the meter and regulation unit 21 to the terminal unit 24 can be used. The size and/or diameter may depend on the amount and/or flow rate and pressure of the natural gas to be expected from the natural gas well 10 and/or interstate/intrastate main 12. The size and/or diameter may also depend on the amount and/or flow rate of the natural gas to be expected for transfer to the terminal unit 24. The pipeline 22, as well as any other component, may be designed to U.S. Department of Transportation's Pipeline and Hazardous materials administration guidelines.

The flow of natural gas from the natural gas well 10 and/or the interstate/intrastate main 12 may be due to the first differential pressure provided by the natural gas well 10 and/or the interstate/intrastate main 12. The first differential pressure may range from 200 to 1,500 pounds per square inch gauge ("PSIG").

Figure 2:
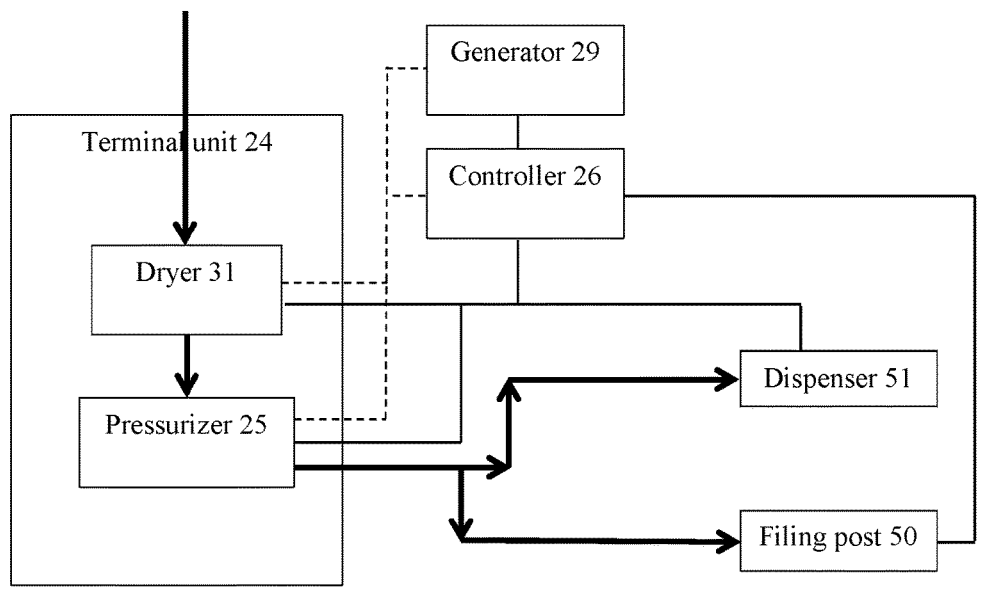
FIG. 2 is an exemplary block diagram of an embodiment of an electro-mechanical schematic that may be used for the terminal unit.

Referring to FIG. 2, the terminal unit 24 can be configured to facilitate flow of the natural gas from the terminal unit 24 to the fill post 50. The fill post 50 can be configured to facilitate flow of the natural gas from the fill post 50 to the container 30. For example, the terminal unit 24 can be a facility configured to facilitate transfer of natural gas to at least one container 30, which may include introducing compressed natural gas into the container 30. This may be achieved via the fill post 50. The terminal unit 24 can further include a control building. The terminal unit 24 may further include a motor control center building, which may be configured to house the pressurizer 25 and/or any drives and associated controls for the pressurizer 25. In some embodiments, the pressurizer 25 may be housed in a building or structure that is separate from the motor control center building. The pressurizer 25 may be a compressor 25. The motor control center building may further include drives and associated controls for other system components, such as a generator, additional compressors, and/or the fill post 50. The terminal unit 24 may further include at least one automatic self-regenerating dryer 31 to remove moisture from the stream of natural gas. As noted above, at least one controller 26 can be in connection with any of the components of the terminal unit 24. In some embodiments, at least one controller 26 can be in the motor control center building.

FIG. 2 shows fluid entering the terminal unit 24 via the pipeline 22. In the schematic of FIG. 2, the fluid passes first through the dryer 31 and then the pressurizer 25 before being directed to the dispenser 51 and/or filing post 50. At least one of the controller 26, the dryer 31, the pressurizer 25, and the generator 29 can be in electrical communication with each other via electrical high power connections (illustrated as dashed thin lines). At least one of the controller 26, the dryer 31, the pressurizer 25, the dispenser 51, and the fill post 50 can be in electrical communication with each other via electrical power/control wire (illustrated as solid thin lines). Other electro-mechanical connections may be used to place the components in electrical communication with each other.

Any one compressor 25 can be configured to utilize a natural gas engine (i.e., be natural gas driven). Any one compressor 25 can be configured to utilize an electrically powered motor (i.e., be electrically driven). Some embodiment can include a 25 to 600 Horsepower (HP) compressor 25. In at least one embodiment, the compressor 25 can be electrically driven using a 300 HP electrical motor. It is contemplated that a local electrical infrastructure may not be able to provide sufficient power to operate an embodiment of the system 100. To supplement the electrical power, or to provide enough power without the electricity from the local electrical infrastructure, at least a portion of the natural gas entering the terminal unit 24 can be diverted from supplying the container 30 and directed to supply a natural gas powered engine. The natural gas powered engine may be configured to drive a generator 29. The natural gas powered engine may be a 50 to 3,500 HP engine, for example. The generator 29 can be configured to produce augmented electrical power. The augmented electrical power may be within a range from 0.5 to 2 Megawatts of electricity, for example. The electricity from the local electrical infrastructure and/or augmented electricity can be used to power the any one or combination of compressors 25, dryers 31, and/or any other electrically drive components of the system 100.

In some embodiments, the generator 29 may be configured to operate only when a compressor 25, or a combination of compressors 25, are in operation. This can include only when compression of the natural gas by a compressor 25, or a combination of compressors 25, takes place. Thus, the augmented electricity may be generated only when a compressor 25, or a combination of compressors 25, are in operation. The system 100 may be further configured so that site lighting and ancillary power for the control building and/or other components of the system 100 is provided from the local electrical infrastructure. For example, the controller 26 may be in electro-mechanical connection with both the compressor 25 and the generator 29. The controller 25 may be programmed to cause the generator 29 to operate when the controller 25 senses the compressor 25 compressing the natural gas. The controller 25 may be programmed to cause the generator 29 to cease operation when the controller 25 senses the compressor 25 not compressing the natural gas.

Some embodiment can include a plurality of fill posts 50 (e.g., four fill posts 50). At least one fill post 50 may include a hoses and valves to facilitate transfer of natural gas from the fill post 50 to a vehicle 40 by which the container 30 is transported. A natural gas dispenser 51 may also be used to facilitate transfer of natural gas to a vehicle 40 by which container 30 is transported. This may be done to provide fuel for vehicles 40 that are configured to operate on natural gas. Other vehicles 40 can be used that may be operated on diesel, gasoline, etc. At least one fill post 50 may include a transfer hose 52. The transfer hose 52 can facilitate transfer of the natural gas from the fill post 50 to the container 30. In some embodiments, the fill post 50 can include more than one transfer hose 52. A transfer hose 52 may be a hose with a diameter ranging from 1 to 2 inches. The diameter may depend on the amount, flow rate, and/or pressure of the natural gas to be expected from the fill post 50 to the container 30. In some embodiment, a fill post 50 can include a grounding cable. In at least one embodiment, the terminal unit 24 and/or the filing station 20 can contain a grounding loop. The grounding cable can be used to electrically ground the fill post 50 to reduce the risk of static charge causing a hazardous situation.

In an exemplary embodiment, when a vehicle 40 transporting the container 30 is placed adjacent the fill post 50, a user may prepare the container 30 for filling. This may include a user connecting the grounding cable to a grounding connection on the container 30. This may be done to reduce the risk of a static charge causing a hazardous situation. A user may secure at least one one-inch diameter transfer hose 52 from the fill post 50 to at least one associated connection of the container 30. This may include securing two one-inch diameter transfer hoses 52 from the fill post 50 to two associated connections of the container 30. The system 100 may transfer natural gas from the fill post 50 to the container 30. Control of the transfer of the natural gas may be achieved via the controller 26. In some embodiments, transfer of the natural gas may be performed automatically via the control of the controller 26. In addition, or in the alternative, a user may use the dispenser 51 to transfer natural gas to the vehicle 40. Control of flow and pressurization of the natural gas from the filling station 20 to the container 30 and/or the vehicle can be via the controller 26. This can include control of flow of the natural gas from the source 10 and/or fluid stream 12.

In an exemplary embodiment, the transfer of the natural gas from the terminal unit 24 to the container 30 can be by the first differential pressure causing the natural gas to flow from the interstate/intrastate main pipeline 12. This may be by allowing the natural gas to free flow from the terminal unit 24 to the container 30. The first differential pressure may be 1,000 PSIG. The controller 26 can cause the system 100 to allow the natural gas to free flow into the container 30 until the natural gas in the container 30 reaches the first pressure and/or the first temperature. The first pressure may be 1,000 PSIG. The first temperature may be 55° F. The controller 26 can then cause at least one compressor 25 to begin compression to increase the pressure of the natural gas from the first differential pressure of 1,000 PSIG to the second differential pressure. The second differential pressure may be 4,250 PSIG. Generating the second differential pressure can cause more of the natural gas to flow into the container 30 until the natural gas within the container 30 reaches the second pressure and/or the second temperature. The second pressure may be 4,250 PSIG. The first temperature may be 0° F. The controller 26 may cause the system 100 to prevent the flow of the natural gas from the terminal unit 24 after the natural gas in the container 30 has reached the second pressure and/or second temperature. This may be achieved by the controller 26 causing the compressor 25 to cease compression and/or causing certain valves to prevent further flow of natural gas from the terminal unit 24 to the container 30.

The system 100 may be configured to augment the first differential pressure to generate the second differential pressure. The second differential pressure may be used to pressurize the natural gas within the container 30 to the second pressure. By augmenting the first differential pressure to generate the second differential pressure, the compressor 25 may be configured to only generate the difference between the second differential pressure and the first differential pressure to generate the second differential pressure between the compressor 25 and the container 30. This can reduce the size, complexity, and maintenance of any of the compressors 25. For example, the compressor 25 may only need to compress from 1,000 PSIG to 4,250 PSIG. With conventional systems, the compressor 25 may have to compress from 50 PSIG to 4,250 PSIG. This can further reduce the size of the electric motor and/or the natural gas engine utilized with the compressor 25. Because the source 10 and/or fluid stream 12 generates an inlet line pressure at the first differential pressure of 1,000 PSIG at the terminal unit 24 and/or fill post 50, the natural gas can free flow (i.e., line fill) into the container 30 to reach the first pressure of 1,000 PSIG without having to operate any of the compressors 25. The system 100 may be configured such that only after the natural gas within the container 30 reaches the first pressure of 1,000 PSIG, then the controller 26 causes the compressors 25 to operate. This can save power and/or wear and tear on the compressor 25.

While the exemplary first differential pressure is disclosed to be 1,000 PSIG, the first pressure to be 1,000 PSIG, the first temperature to be 55° F., the second differential pressure to be 4,250 PSIG, the second pressure to be 4,250 PSIG, the second temperature to be 0° F., other pressures and temperatures can be used. For example, the first differential pressure may range from greater than 100 PSIG to 1,400 PSIG. The first pressure may range from greater than 200 PSIG to 1,500 PSIG. The first temperature may range from 0° F. to 100° F. The second differential pressure may range from greater than 1,500 PSIG to 3,900 PSIG. The second pressure may range from greater than 500 PSIG to 5,400 PSIG. The second temperature may range from −50° F. to 200° F.

In some embodiments, algorithms within the program logic of the controller 26 can determine when the natural gas occupies a pre-determine level of volume and/or reaches a pre-determined density within the container 30. This may include determining when the container 30 is full. For example, the controller 26 may be programmed to measure the natural gas temperature and/or natural gas pressure within the container 30, which may be used to ascertain the quantity of natural gas that is within the container 30. The controller 26 may cause the system 100 to continue the flow of the natural gas from the terminal unit 24 until the natural gas in the container 30 reaches the pre-determined level of volume, density, pressure, and/or temperature. The controller 26 may cause the system 100 to prevent the flow of the natural gas from the terminal unit 24 after the natural gas in the container 30 reaches the pre-determined level of volume, density, pressure, and/or temperature.

In some embodiments, the system 100 can be configured to transfer natural gas from the terminal unit 24 to a plurality of containers 30. This may include transfer of natural gas via a plurality of fill posts 50. The controller 26 may be programmed to coordinate sequence operations to optimize compressions of any one or combination of the compressors 25. This may include coordinating sequence operation to effectively and/or efficiently transfer natural gas to each container 30. The transfer of the natural gas to the plurality of containers 30 can be simultaneous, in a sequential order, or in any combination thereof.

Figure 3:
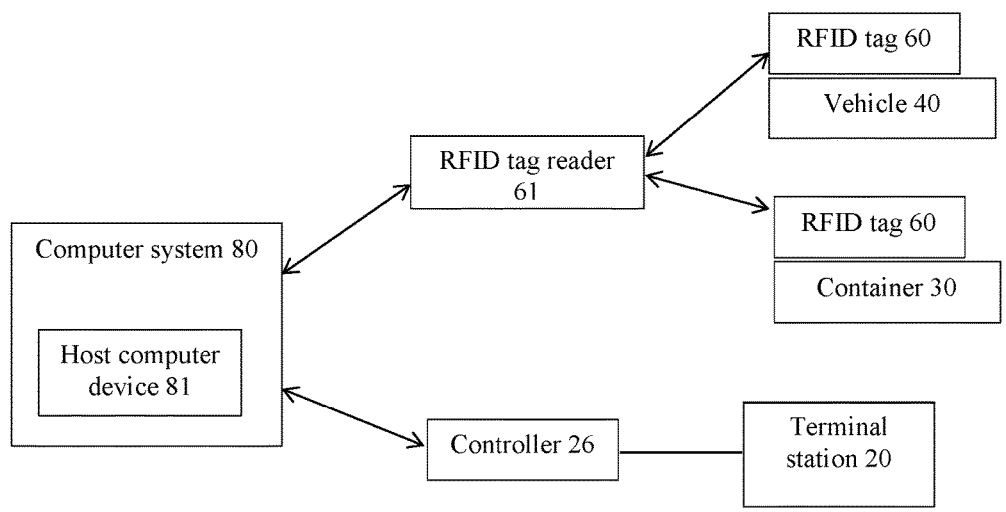
FIG. 3 is an exemplary block diagram of an embodiment of a computer system that may be used to provide tracking and/or supply chain management of vehicles and/or containers that may be equipped with markers.

Referring to FIG. 3, in some embodiments, the vehicle 40 and/or the container 30 may be provided with a marker 60 configured to allow for tracking and/or supply chain management. For example, the vehicle 40 and/or the container 30 can be provided with a Radio Frequency Identification Device (RFID) tag, a bar code, etc. In an exemplary embodiment, the marker 60 can be a RFID tag 60. The RFID tag 60 can be active or passive. In some embodiments, fill posts 50 and/or delivery sites 70 or customer site can include a marker reader 61. In an exemplary embodiment, the marker reader 61 can be a RFID tag reader 61. In some embodiments, drivers of the vehicles 40 can use a hand-held RFID tag reader 61. Some RFID tag readers 61 can be communicatively associated with a computer system 80. The computer system 80 can include at least one processor in electrical communication with a non-transitory, non-volatile memory. Some RFID tag readers 61 can be configured to transfer data to and receive data from a processor of the computer system 80. In addition, any controller 26 can be configured to transfer data to and receive data from a processor of the computer system 80. These transfers of data can be via hardwire and/or via wireless communications.

Wireless communications can be achieved via use of transceivers, for example. For example, any of the RFID tags 60, RFID readers 61, controllers 30 and/or processors of the computer system 80 can include a transceiver configured to transmit and/or receive data. Communication with the computer system 80 can further include communication via the Internet or other system of interconnected computer networks. Communication can be via a communication network. For example, any processor of the computer system 80 may be provided with a communication interface to facilitate transfer of data through the communication network.

A processor of the computer system 80 can be configured as a host computer device 81. The host computer device 81 can administer the computer system 80. Data transmitted from the RFID tag 60 can be transferred to the host computer device 81 via the computer system 80 for storage, analysis, and/or data manipulation. The host computer device 81 can be further configured to transfer data via the computer system 80 to the RFID reader 61. The RFID tag 60 can be programmable. For instance, an RFID tag reader 61 may not only read information from the RFID tag 60 but may also transfer information to the RFID tag 60. For example, a container 30, having an associated RFID tag 60, that has been transported to a fill post 50 may be read by a RFID tag reader 61. The data within the RFID tag 60 can include container information (e.g., weight, fill capacity, limitations of the container 30, time the container 30 arrived, pressure of the natural gas in the container 30, etc.). The data read by the RFID tag reader 61 can include the container information. The container information may be transmitted to the host computer device 81 in any manner described herein. The system 100 may then be used to transfer natural gas into the container 30. The controller 26 can also transfer data to the host computer device 81. This data may include volume, flow-rate, flux, pressure, etc. of the natural gas and/or other system 100 statistics and/or operational parameters. The host computer device 81 can then update the container information to reflect the change in status of the container 30 and/or add the additional information from the controller 26. The updated container data can be transmitted back to the RFID tag reader 61. The RFID tag reader 61 may be used to reprogram the RFID tag 60 with the updated container data.

The container 30 can be a hexagon shaped container 30. For example, the container 30 can be a Hexagon Lincoln® trailer style container 30. Other container 30 types can be used. For example, Type I, II, II, and/or IV trailer-style containers 30 may be used. Type I may be steel tube trailers. Type II may be steel tube and hoop wound with carbon fiber. Type III may be aluminum lined and completely wound in carbon fiber. Type IV may be polymer lined and wound in 100% composite material. The various types can have different capacities, different weights, and/or different pressure ratings. The highest temperature the Hexagon Lincoln® trailer can withstand may be 226° F. before the pressure relief valves operates. Both temperature and pressure can impact the type of pipe material that is used. For example, black iron may normally used upwards of 1,400 psi. Stainless steel may easily accommodate pressures up to 6,000 psi. The lowest safe temperature for black iron may be −20° F. The lowest safe temperature for stainless steel may be −60° F.

The vehicles 40 can be used to transport the container 30 having natural gas to a delivery site 70 or a customer site. The delivery site 70 may be a staging area to position the container 30 so that the container 30 can be used as a supply of natural gas for a user. In some embodiments, the natural gas can be depressurized when transferred from the container to the user. This can include depressurizing the fluid to a third pressure. The third pressure may be less than the second pressure. For example, the desired pressure (i.e., the third pressure) of natural gas for use in a residential or commercial building may be ¼ psi. Thus, the natural gas being transferred from the container 30 to the user (e.g., a residential building) can be depressurized to ¼ psi, or some other pressure, before being transferred to the user.

Figure 4:
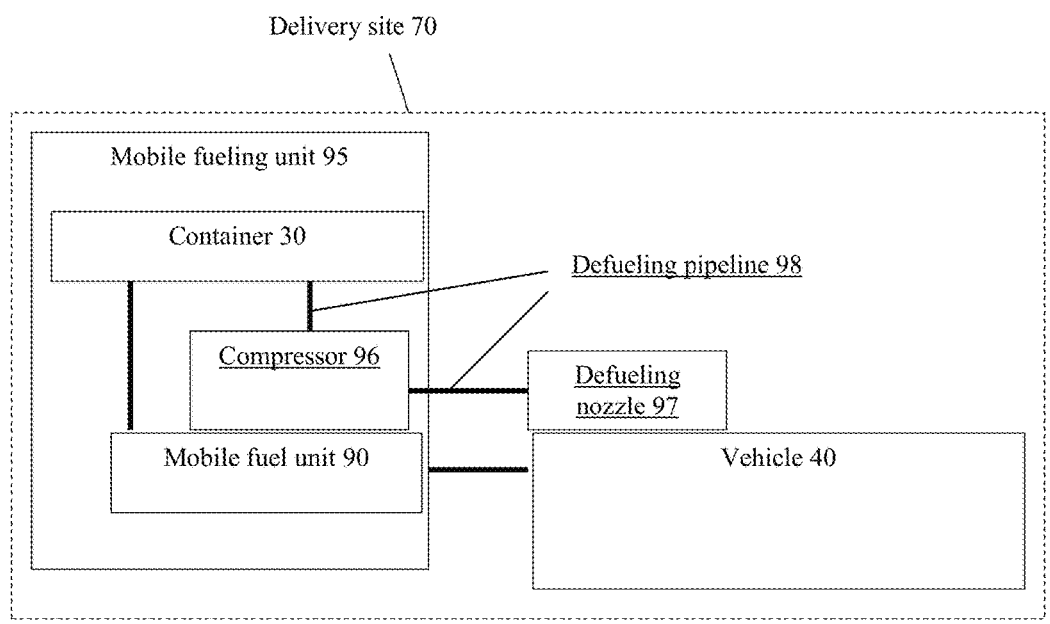
FIG. 4 is an exemplary block diagram of an embodiment of a mobile fuel unit that may be used at a delivery site or a customer site.

Referring to FIG. 4, in some embodiments, the container 30 can include a mobile fuel unit 90. The mobile fuel unit 90 may be mounted onto a trailer. The mobile fuel unit 90 may be configured to facilitate remote fleet fueling. For example, at least one container 30 can be used as a supply for natural gas for other vehicles 40, including feet customers, that may operate on natural gas. The mobile fuel unit 90 may include a centrifugal compressor 96 or a hydraulic compressor. The compressor 96 may be self-contained. The compressor 96 may be configured to be driven by a natural gas fired engine or an electric motor. The mobile fuel unit 90 can be placed into fluid transfer with the container 30 to facilitate flow of natural gas from the container to a vehicle 40. For example, the compressor may be piped to the container 30. The compressor 96 could also be connected to a LDC pipe which would serve as the gas source to the mobile fuel unit 90. The compressor 96 may be used with an integral dispenser of the mobile fuel unit 90. In some embodiments, the compressor 96 may be used in connection with a standalone remote dispenser. The integral dispenser may include at least one of a Natural Gas Vehicle-1 ("NGV-1) and a NGV-2 fueling receptacle. This may facilitate transferring natural gas from the container 30 via the mobile fuel unit 90 to a vehicle 40 (e.g., a NGV-1 vehicle and/or NGV-2 vehicle 40). The mobile fuel unit 90 may further include a buffer tank. This may be a 700 Diesel Gallon Equivalent ("DGE") buffer tank.

The buffer tank can range in size from minimum of 100 to 1,000 DGE, depending on the desired buffer capacity. A buffer tank may include at least one cylinder mounting on a container 30. For example, a buffer tank may include 16 type IV cylinders mounted in separate banks within a container 30. This may include mounting the cylinders on four separate banks within the container 30. The cylinders may be interconnected with a variety of pipe, valves, and fittings to allow the ability to fill and operate the tanks as low, medium, and high banks. The buffer tanks may be connected via hose to the container 30. Other container 30 types can be used to supply gas to the mobile fuel unit 90. The mobile fuel unit 90 can then be mounted onto a trailer that is pulled by vehicle 40. Another option may be to mount the mobile fuel unit 90 on a container 30. Other vehicle fuel types, such a diesel and gasoline, for example, could be used to pull the trailer. The trailer may be a dual axle trailer. The trailer can range in size from 30 feet to 53 feet. The size of the trailer may depend on the size and configuration of the compressor and/or the buffer tanks. The buffer tanks can be also mounted on this same trailer and connected to the compressor via stainless steel piping, valves, and fittings.

The mobile fuel unit 90 may be mounted onto the container 30. The container 30 with the mobile fuel unit 90 may be referred to as a mobile fueling unit 95. The mobile fueling unit 95 can be transported by the vehicle 40 configured to haul the container 30. The vehicle 40 may then transport the mobile fueling unit 95 to a delivery site 70. Embodiments of the mobile fueling unit 95 can facilitate transfer of natural gas from the container 30 to other vehicles 40 that operate on natural gas. For example, a vehicle 40 may be driven to the delivery site 70, where the dispensers of the mobile fuel unit 90 can be used to transfer natural gas from the container 30 to the vehicle 40. In some embodiments, natural gas being transferred to the vehicle 40 can be pressurized to 3,600 PSIG. This can be achieved via the compressor 96 of the mobile fuel unit 90. Flow rates for the mobile fueling solution can range from 8 to 9 DGE (slow) to upwards of 19 DGE (fast). The flow rate can depend on the type of compressor 96, motor size on the compressor 96, and/or the inlet pressure conditions, i.e., getting gas from a hexagon at 3,600 vs getting gas from local LDC at 100 psi.

Some embodiments of the mobile fueling unit 95 can be configured to facilitate defueling. This can include defueling a vehicle 40 that may be configured to operate on the natural gas. For example, it may be desired to purge (i.e., defuel) natural gas from the engine and/or other components (e.g., cylinders, valves, etc.) of the vehicle 40. This may be desired when maintenance is to be performed on the vehicle 40, for example. Conventional de-fueling techniques are generally limited to feeding the natural gas from the vehicle 40 to a low pressure system and venting the natural gas to the atmosphere. Embodiments of the mobile fueling unit 95, however, may be used to capture or tap the natural gas being removed from the vehicle 40, as opposed to venting it.

Figure 5:
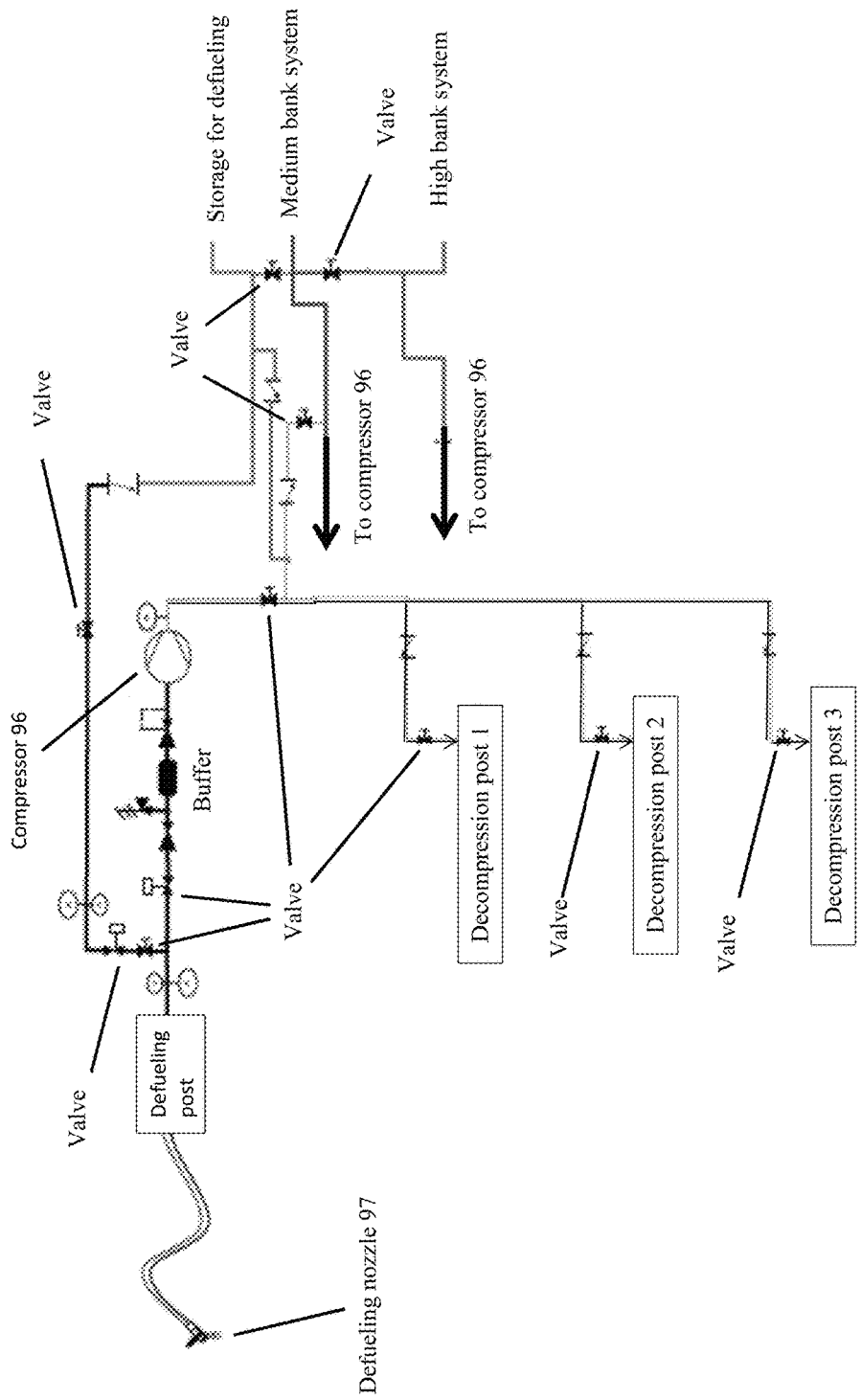
FIG. 5 is an exemplary schematic of an embodiment of a defueling system.

Referring to FIGS. 4-5, in at least one embodiment of the mobile fueling unit 95 can be configured to defuel a vehicle 40 by feeding the natural gas from the vehicle 40 into a high pressure system. For example, embodiments of the mobile fueling unit 95 can include a defueling nozzle 97. The defueling nozzle 97 may be configured to connect with the fuel system of the vehicle 40. This can include connection with the natural gas inlet manifold of the vehicle 40. The defueling nozzle 97 may be further configured to connect with a defueling pipeline 98. For example, the defueling nozzle 97 may include a hose line to facilitate connection to the defueling pipeline 98. The defueling pipeline 98 can be in connection with the compressor 96 of the mobile fuel unit 90. Some embodiments can include a grounding cable to electrically ground the vehicle 40 and/or its fuel system. This may be done to reduce the risk of static charge causing a hazardous situation.

An exemplary process of defueling a vehicle 40 can include grounding the vehicle 40 and/or its fuel system. This can include connection a portion of the vehicle 40 and/or its fuel system to ground via the grounding cable. The vehicle's 40 fuel system can be connected to the defueling pipeline 98. This may be done by connecting the defueling nozzle 97 to the vehicle's fuel system. The pressure between the vehicle's 40 fuel system and that of the defueling pipeline 98 can be equalized. This may be achieved by opening a valve within the defueling system to allow natural gas to flow between the vehicle's 40 fuel system and the defueling pipeline 98 until an equilibrium is reached. For example, the defueling pipeline 98 may be at a lower pressure than that of the vehicle's 40 fuel system, thereby allowing at least some of natural gas to flow from the vehicle's 40 fuel system to the defueling pipeline 98 until the pressure within the vehicle's 40 fuel system is equal to, or substantially equal to, the pressure in the defueling pipeline 98. Alternatively, the defueling pipeline 98 may be at a higher pressure than that of the vehicle's 40 fuel system, thereby allowing at least some of natural gas to flow from the defueling pipeline 98 to the vehicle's 40 fuel system until the pressure within the defueling pipeline 98 is equal to, or substantially equal to, the pressure in the vehicle's 40 fuel system. The system may then reduce or cut the remainder of the pressure within the vehicle's fuel system. This can be achieved via a pressure reducing regulator. The reduction of pressure in the vehicle's 40 fuel system may be done to match the inlet pressure of the compressor 96. The compressor 96 of the mobile fuel unit 90 can then increase the pressure of any remaining natural gas within the vehicle's 40 fuel system to cause at least some of it to flow from the vehicle's 40 fuel system. This may include causing at least some of the natural gas to flow from the vehicle's 40 fuel system to the defueling pipeline 98. The defueling pipeline 98 may be connected to the container 30. Causing at least some of the natural gas to flow from the vehicle's 40 fuel system to the defueling pipeline 98 can cause the pressure within the defueling pipeline 98 to increase. This may allow at least some of the natural gas within the defueling pipeline 98 to flow from the defueling pipeline 98 to the container 30.

It should be understood that modifications to the embodiments disclosed herein can be made to meet a particular set of design criteria. For instance, the number and/or configuration of sources 10, fluid streams 12, filing stations 20, fluids 10, containers 30, pressurizers 25, fill posts 50, controllers 26, generators 29, mobile fueling units 90, markers 60, marker readers 61, computer systems 80, and/or any other components can be used to meet a particular objective.

We claim:

1. A fluid transfer system, comprising:
a receiving location comprising a first processing means to receive a fluid from a sourcing location via a first differential pressure provided by the sourcing location;
a container configured to receive the fluid from the receiving location via the first differential pressure until the fluid within the container reaches a first pressure and/or a first temperature; and,
the first processing means further comprising a pressurizer to increase a pressure of the fluid so that a second differential pressure is generated between the receiving location and the container, the second differential pressure causing the fluid to transfer into the container until the fluid within the container reaches a second pressure and/or a second temperature;
wherein the pressurizer is a compressor;
wherein the compressor is configured to be at least one of electrically driven by an electrical motor and natural gas driven by a natural gas engine;
wherein:
the receiving location further comprises an electrical generator configured to operate on the fluid; and,
at least some of the fluid received by the receiving location is diverted to the electrical generator to generate augmented electrical power.

2. The fluid transfer system recited in claim 1, wherein the fluid transfer system further comprises the sourcing location, the sourcing location comprising a second processing means to generate the first differential pressure.

3. The fluid transfer system recited in claim 2, wherein the second processing means comprises at least one source of the fluid and/or at least one fluid stream.

4. The fluid transfer system recited in claim 3, wherein the at least one source comprises a natural gas well and the at least one fluid stream comprises an interstate/intrastate main pipeline.

5. The fluid transfer system recited in claim 1, wherein the pressurizer increases the pressure by an amount that is a difference between the second differential pressure and the first differential pressure.

6. The fluid transfer system recited in claim 1, wherein the first processing means further comprises a meter and regulation unit configured to receive the fluid from the sourcing location, a terminal unit comprising the pressurizer and configured to selectively transfer the fluid to a fill post, and a pipeline configured to facilitate transfer of the fluid from the meter and regulation unit to the terminal unit.

7. The fluid transfer system recited in claim 1, further comprising at least one controller in electro-mechanical connection with the pressurizer, the controller programmed to measure a pressure and/or a temperature of the fluid within the container.

8. The fluid transfer system recited in claim 7, wherein the at least one controller is further programmed to:
cause the pressurizer to increase the pressure of the fluid from the first differential pressure to the second differential pressure after the fluid within the container has reached the first pressure and/or the first temperature;
cause the pressurizer to cause more of the fluid to flow into the container until the fluid within the container reaches the second pressure and/or the second temperature; and,
cause the system to prevent the flow of fluid from the receiving location after the fluid in the container has reached the second pressure and/or the second temperature.

9. The fluid transfer system recited in claim 1, wherein the augmented electrical power is transferred to the compressor.

10. The fluid transfer system recited in claim 1, further comprising a controller in electro-mechanical connection with both the compressor and the generator, wherein:
the controller is programmed to cause the generator to operate when the controller senses the compressor compressing the fluid; and,
the controller is programmed to cause the generator to cease operation when the controller senses the compressor not compressing the natural gas.

11. The fluid transfer system recited in claim 6, wherein the fill post further comprises:
at least one dispenser to transfer the fluid from the fill post to a vehicle; and
at least one transfer hose to transfer the fluid from the fill post to the container.

12. The fluid transfer system recited in claim 1, wherein the system is configured to transfer the fluid from the receiving location to a plurality of containers.

13. The fluid transfer system recited in claim 7, further comprising a computer system by which the at least one controller is in electrical communication with.

14. The fluid transfer system recited in claim 13, wherein:
the container is configured to be transported by a vehicle;
at least one of the container and the vehicle is provided with a RFID tag; and,
the system further comprises a RFID tag reader, the RFID tag reader in electrical communication with the computer system.

15. A method of fluid transfer, comprising:
receiving, at a receiving location, a fluid from a sourcing location, the sourcing location providing a first differential pressure to cause the fluid to flow;
receiving, at a container, the fluid from the receiving location by means of the first differential pressure until the fluid within the container reaches a first pressure and/or a first temperature;
increasing the pressure of the fluid via a pressurizer so that a second differential pressure is generated between the receiving location and the container, the second differential pressure causing the fluid to transfer into the container until the fluid within the container reaches a second pressure and/or a second temperature; and,
diverting, via the programmable logic controller, at least some of the fluid to selectively generate augmented electrical power.

16. The method of fluid transfer recited in claim 15, further comprising measuring, via a programmable logic controller, a pressure and/or a temperature of the fluid within the container.

17. The method of fluid transfer recited in claim 15, further comprising transporting the container, via a vehicle, to a delivery site.

18. The method of fluid transfer recited in claim 17, further comprising tracking at least one of the container and the vehicle via a computer system.

19. The method of fluid transfer recited in claim 18, wherein the tracking comprises reading at least one RFID tag attached to the container and/or the vehicle.

20. The method of fluid transfer recited in claim 15, wherein the sourcing location is an interstate/intrastate transmission main.

21. The method of fluid transfer recited in claim 20, wherein the fluid is natural gas.

22. The method of fluid transfer recited in claim 21, further comprising selectively transferring at least some of the natural gas to the container via a fill post.

23. The method of fluid transfer recited in claim 22, further comprising selectively transferring at least some of the natural gas to the vehicle via a fill post.

24. The method of fluid transfer recited in claim 15, further comprising transferring the fluid from the container to a user.

25. A method of fluid transfer, comprising:
tapping into an interstate/intrastate transmission main;
receiving, at a filing station, natural gas from the interstate/intrastate transmission main via a processing means of the filing station, the processing means comprising a meter and regulation unit configured to receive the natural gas from the interstate/intrastate transmission main, a terminal unit comprising a first compressor configured to selectively transfer the natural gas to a fill post, and a pipeline configured to facilitate transfer of the natural gas from the meter and regulation unit to the terminal unit;
controlling, via a programmable logic controller, the natural gas flow by allowing a first differential pressure of the interstate/intrastate transmission main to cause the natural gas to transfer from the interstate/intrastate transmission main to the meter and regulation unit;
selectively controlling, via the programmable logic controller, the natural gas flow by first allowing the first differential pressure to cause the flow of the natural gas from the meter and regulation unit, through the pipeline, through the terminal unit, through the fill post, and into a container until the natural gas within the container reaches a first pressure and/or a first temperature, and then by causing the first compressor to increase the pressure of the natural gas so that a second differential pressure is generated between the first compressor and the container to cause more natural gas to flow from the terminal unit, through the fill post, and into the container until the natural gas within the container reaches a second pressure and/or a second temperature, the second differential pressure being greater than the first differential pressure, the second pressure and/or the second temperature being greater than the first pressure and/or first temperature;

measuring, via the programmable logic controller, the pressure and/or temperature of the natural gas within the container;

diverting, via the programmable logic controller, at least some of the natural gas to a natural gas generator to selectively generate augmented electrical power, the augmented electrical power being selectively transferred to the first compressor, the generator selectively generating the augmented electrical power and selectively transferring the augmented electrical power to the first compressor only when the first compressor is increasing the pressure of the natural gas;

selectively transferring the natural gas from the fill post and into a vehicle;

transporting the container via the vehicle from the filling station to a delivery site; and transferring the natural gas from the container to a user.

\* \* \* \* \*